United States Patent
Eitouni et al.

(10) Patent No.: US 10,879,563 B2
(45) Date of Patent: Dec. 29, 2020

(54) CROSSLINKED-INTERPENETRATING NETWORKED BLOCK COPOLYMER ELECTROLYTES FOR LITHIUM BATTERIES

(71) Applicant: Robert Bosch GmbH, Stuttgart (DE)

(72) Inventors: Hany Basam Eitouni, Oakland, CA (US); Jonathan C. Pistorino, Oakland, CA (US); Russell Clayton Pratt, San Mateo, CA (US); Kulandaivelu Sivanandan, Fremont, CA (US)

(73) Assignee: Robert Bosch GmbH, Stuttgart (DE)

(*) Notice: Subject to any disclaimer, the term of this patent is extended or adjusted under 35 U.S.C. 154(b) by 371 days.

(21) Appl. No.: 15/449,872

(22) Filed: Mar. 3, 2017

(65) Prior Publication Data

US 2017/0256818 A1 Sep. 7, 2017

Related U.S. Application Data

(60) Provisional application No. 62/304,209, filed on Mar. 5, 2016.

(51) Int. Cl.
*H01M 10/0565* (2010.01)
*C08J 3/24* (2006.01)
(Continued)

(52) U.S. Cl.
CPC ...... *H01M 10/0565* (2013.01); *C08G 81/025* (2013.01); *C08J 3/246* (2013.01);
(Continued)

(58) Field of Classification Search
CPC .......................... H01M 10/0565; H01M 4/382
See application file for complete search history.

(56) References Cited

U.S. PATENT DOCUMENTS 8,268,197 B2  9/2012 Singh et al.
8,563,168 B2  10/2013 Balsara et al.
(Continued)

FOREIGN PATENT DOCUMENTS

CN  1330045 C  8/2007
CN  104241677 A  12/2014
(Continued)

OTHER PUBLICATIONS

International Search Report and Written Opinion for PCTUS1720824 dated May 23, 2017.
(Continued)

*Primary Examiner* — Tae-Sick Kang
(74) *Attorney, Agent, or Firm* — Brooks Kushman P.C.

(57) ABSTRACT

A novel solid block copolymer electrolyte material is described. The material has first structural polymer blocks that make up a structural domain that has a modulus greater than $1\times10^7$ Pa at 25° C. There are also second ionically-conductive polymer blocks and a salt that make up an ionically-conductive domain adjacent to the structural domain. Along with the second ionically-conductive polymers, there is also a crosslinked network of third polymers, which interpenetrates the ionically-conductive domain. The third polymers are miscible with the second polymers. It has been shown that the addition of such an interpenetrating, crosslinked polymer network to the ionically-conductive domain improves the mechanical properties of the block copolymer electrolyte with no sacrifice in ionic conductivity.

20 Claims, 5 Drawing Sheets

(51) Int. Cl.
*C08J 5/20* (2006.01)
*H01M 10/052* (2010.01)
*C08G 81/02* (2006.01)
*H01M 4/38* (2006.01)
*H01M 4/40* (2006.01)
*H01M 10/0525* (2010.01)

(52) U.S. Cl.
CPC .............. *C08J 5/20* (2013.01); *H01M 4/382* (2013.01); *H01M 4/405* (2013.01); *H01M 10/052* (2013.01); *H01M 10/0525* (2013.01); *H01M 2300/0082* (2013.01)

(56) References Cited

U.S. PATENT DOCUMENTS

| | | |
|---|---|---|
| 8,598,273 B2 | 12/2013 | Eitouni et al. |
| 8,691,928 B2 | 4/2014 | Hsieh et al. |
| 8,889,301 B2 | 11/2014 | Balsara et al. |
| 9,048,507 B2 | 6/2015 | Eitouni et al. |
| 9,136,562 B2 | 9/2015 | Singh et al. |
| 2006/0102869 A1 | 5/2006 | Cavaille et al. |
| 2009/0075176 A1 | 3/2009 | Singh et al. |
| 2009/0297911 A1 | 12/2009 | Moore et al. |
| 2012/0315547 A1* | 12/2012 | Itoh ............... C08F 299/024 429/312 |
| 2013/0066025 A1* | 3/2013 | Yang ............... C08L 71/02 525/523 |
| 2014/0322614 A1 | 10/2014 | Itouni et al. |
| 2015/0303515 A1* | 10/2015 | Pratt ............... H01M 10/0565 429/312 |
| 2016/0087306 A1* | 3/2016 | Lee ............... H01M 10/052 429/317 |

FOREIGN PATENT DOCUMENTS

| | | |
|---|---|---|
| EP | 3001494 A1 | 3/2016 |
| WO | 2009146340 A1 | 12/2009 |
| WO | 2010083325 A1 | 7/2010 |
| WO | 2010083330 A1 | 7/2010 |

OTHER PUBLICATIONS

First Office Action for Chinese Application No. 201780015444.4, dated Jul. 11, 2019, 8 pages.

* cited by examiner

CROSSLINKED-INTERPENETRATING NETWORKED BLOCK COPOLYMER ELECTROLYTES FOR LITHIUM BATTERIES

CROSS-REFERENCE TO RELATED APPLICATIONS

This application claims priority to U.S. Provisional Patent Application 62/304,209, filed Mar. 5, 2016, which is incorporated by reference herein.

BACKGROUND OF THE INVENTION

Field of the Invention

This invention relates generally to electrolytes for lithium batteries, and, more specifically, to high conductivity solid polymer electrolytes that have increased mechanical strength.

The demand for rechargeable batteries has grown by leaps and bounds as the global demand for technological products such as cellular phones, laptop computers and other consumer electronic products has escalated. In addition, interest in rechargeable batteries has been fueled by current efforts to develop green technologies such as electrical-grid load leveling devices and electrically-powered vehicles, which are creating an immense potential market for rechargeable batteries with high energy densities.

Li-ion batteries represent one of the most popular types of rechargeable batteries for portable electronics. Li-ion batteries offer high energy and power densities, slow loss of charge when not in use, and they do not suffer from memory effects. Because of many benefits, including high energy density, Li-ion batteries have also been used increasingly in defense, aerospace, back-up storage, and transportation applications.

The electrolyte is an important part of a Li-ion rechargeable battery. During discharging, the electrolyte is a medium for ion flow between the electrodes, as a negative electrode material is oxidized, producing electrons, and a positive electrode material is reduced, consuming electrons. The electrons flow as current through an external circuit. Traditional Li-ion rechargeable batteries have used non-polymer liquid electrolytes. Exemplary liquid electrolytes in Li-ion batteries are composed of lithium-salts such as $LiPF_6$, $LiBF_4$, or $LiClO_4$ in organic solvents such as alkyl carbonates.

While non-polymer liquid electrolytes dominate current Li-based technologies, solid polymer electrolytes may constitute the next wave of advances for Li-based batteries. The solid polymer electrolyte rechargeable battery is especially attractive for Li-ion battery technology because, among other benefits, polymer electrolytes have high thermal stability, low rates of self-discharge, stable operation over a wide range of environmental conditions, enhanced safety, flexibility in battery configuration, minimal environmental impacts, and low materials and processing costs. Solid polymer electrolytes have been of exceptional interest partly due to their amenability to novel form factors and packaging methods as seen in the thin, vacuum-sealed pouch cell designs of recent batteries for portable electronics.

Cross-linking or thermosetting of the polymer matrix has been used to enhance the mechanical robustness of solid electrolytes. However, after cross-linking, the electrolyte no longer flows and is insoluble, thereby severely limiting subsequent processibility as well as integration of the electrolyte with other battery components and packaging. And unfortunately, cross-linking tends to reduce ionic conductivity.

One approach has been to use block copolymer electrolyte materials. One such material employs blocks of PEO (polyethylene oxide) together with mechanically rigid blocks such as polystyrene. But for such an electrolyte there is a tradeoff between rigidity and conductivity. Rigidity increases as the proportion of rigid blocks increases. But the increased proportion of rigid blocks comes at the cost of a decreased proportion of PEO blocks, which reduces ionic conductivity.

Thus increased mechanical strength either through increased crosslinking or through larger proportions of mechanical blocks (in a block copolymer electrolyte) comes at the cost of lowering conductivity.

There is a strong need for solid polymer electrolyte materials that have high ionic conductivity coupled with high mechanical strength and low reactivity with lithium.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

An electrolyte material is disclosed. In one embodiment of the invention, the electrolyte material has a first domain that has a modulus greater than $1 \times 10^7$ Pa at 25° C. The first domain includes a plurality of first polymer blocks. There is also a second domain, adjacent to the first domain, that forms an ionically-conductive portion of the electrolyte material. The second domain includes a plurality of second polymer blocks and a salt. There is also a crosslinked interpenetrating network of third polymers within the second domain. In some arrangements, the first domain and the second domain are lamellar domains. In one arrangement, the second domain makes up at least 50% (by volume) of the electrolyte material. In another arrangement, the second domain makes up at least 75% (by volume) of the electrolyte material.

The electrolyte material may have an ionic conductivity of at least $1 \times 10^{-5}$ Scm$^{-1}$ at 90° C.

The electrolyte material may be either a diblock copolymer or a triblock copolymer that includes the first polymer blocks and the second polymer blocks.

In one embodiment of the invention, the first polymers are one or more selected from the group consisting of as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly (cyclohexyl vinyl ether), polyethylene, poly(phenylene oxide), poly(phenylene sulfide sulfone), poly(phenylene sulfide ketone), poly(phenylene sulfide amide), polysulfone, polyfluorocarbons, and copolymers that contain styrene, methacrylates, and/or vinylpyridine.

In one embodiment of the invention, the second polymers are one or more selected from the group consisting of polyethers, polyamines, polyimides, polyamides, alkyl carbonates, polynitriles, polysiloxanes, polyphosphazines, polyolefins, polydienes, and combinations thereof.

In another arrangement, the second polymers are ionically-conductive comb polymers, which comprise backbones and pendant groups. The backbones may be one or more of polysiloxanes, polyphosphazines, polyethers, polydienes, polyolefins, polyacrylates, polymethacrylates, and combinations thereof. The pendants may be one or more of oligoethers, substituted oligoethers, nitrile groups, sulfones, thiols, polyethers, polyamines, polyimides, polyamides, alkyl carbonates, polynitriles, other polar groups, and combinations thereof.

In one embodiment of the invention, the third polymers are miscible with the second polymers and are one or more of poly(ethylene oxide-co-allyl glycidyl ether), poly(methylmethacrylate-block-allyl glycidyl ether), poly[allylamine-b-(ethyleneoxide-co-allylglycidylether)], poly[oxydiphenylene-pyromellitimide-b-(ethyleneoxide-co-allylglycidylether)], poly[pthalamide-b-(ethyleneoxide-co-allylglycidylether], poly(vinylenecarbonate-b-vinylmethylsiloxane), poly(vinylenecarbonate-b-divinylsiloxane), poly[acrylonitrile-b-(styrene-co-allyloxyl styrene)], poly(acrylonitrile-b-isoprene), poly(vinylmethylsiloxane-b-ethyleneoxide), poly[dimethylsiloxane-b-(ethyleneoxide-co-allylglycidylether)], poly[phosphazines-graft-(ethyleneoxide-co-allylglycidylether)], poly(divinylphosphazine-graft-ethyleneoxide), poly[isoprene-b-(ethyleneoxide-co-allylglycidylether)], and poly[ethylene-b-(ethyleneoxide-co-allylglycidylether)].

In one arrangement, the second polymers include PEO, and the third polymers include poly(ethylene oxide-co-allyl glycidyl ether).

In another embodiment of the invention, an electrolyte material has a first domain with a modulus greater than $1 \times 10^7$ Pa at 25° C. The first domain includes a plurality of first polymer blocks. There is also a second domain, adjacent to the first domain, that forms an ionically-conductive portion of the electrolyte material. The second domain includes a plurality of PEO polymer blocks and a salt. There is also a crosslinked interpenetrating network of poly(ethylene oxide-co-allyl glycidyl ether) within the second domain. In some arrangements, the first domain and the second domain are lamellar domains. In one arrangement, the second domain makes up at least 50% (by volume) of the electrolyte material.

In another embodiment of the invention, a battery cell, is disclosed. The battery cell has a positive electrode that includes a first electrolyte and positive electrode material, a negative electrode that includes lithium metal or lithium alloy, and a second electrolyte between the positive electrode and the negative electrode. The second electrolyte has a first domain that has a modulus greater than $1 \times 10^7$ Pa at 25° C. The first domain includes a plurality of first polymer blocks. There is also a second domain, adjacent to the first domain, that forms an ionically-conductive portion of the electrolyte material. The second domain includes a plurality of second polymer blocks and a salt. There is also a crosslinked interpenetrating network of third polymers within the second domain. In some arrangements, the first domain and the second domain are lamellar domains.

DETAILED DESCRIPTION

The preferred embodiments are illustrated in the context of electrolyte materials in lithium ion batteries. The skilled artisan will readily appreciate, however, that the materials and methods disclosed herein will have application in a number of other electrochemical contexts where both mechanical rigidity and high ionic conductivity are important.

These and other objects and advantages of the present invention will become more fully apparent from the following description taken in conjunction with the accompanying drawings.

All publications referred to herein are incorporated by reference in their entirety for all purposes as if fully set forth herein.

Definitions

In this disclosure, the terms "negative electrode" and "anode" are both used to mean "negative electrode". Likewise, the terms "positive electrode" and "cathode" are both used to mean "positive electrode".

It is to be understood that the terms "lithium metal" or "lithium foil," as used herein with respect to negative electrodes, are meant to include both pure lithium metal and lithium-rich metal alloys as are known in the art. Examples of lithium rich metal alloys suitable for use as anodes include Li—Al, Li—Mg, Li—Si, Li—Sn, Li—Hg, Li—Zn, Li—Pb, Li—C, and as are known to a person with ordinary skill in the art. Other negative electrode materials that can be used in the embodiments of the invention include materials in which lithium can intercalate, such as graphite. Many embodiments described herein are directed to batteries with solid polymer electrolytes, which serve the functions of both electrolyte and separator. As is well known in the art, batteries with liquid electrolytes use an inactive separator that is distinct from the liquid electrolyte.

The molecular weights given herein are weight-averaged molecular weights.

The term "interpenetrating polymer network" (IPN) is used herein to mean a crosslinked polymer network that is spread throughout or pervades. For example, an IPN within a non-crosslinked second polymer is miscible with the second polymer, and is present throughout the second polymer. The second polymer fills spaces within the network made by the crosslinked polymer. Additionally, an IPN can be formed by a crosslinked polymer network that is spread throughout or pervades a specific phase of a multiphase polymer network. The term "IPN" can be used to describe a kind of block copolymer (an IPN block copolymer) that has two or more phases. At least one phase includes an IPN made of a crosslinkable polymer that is miscible only within that one phase and is crosslinked only within that one phase.

As discussed above, there has been success in using block copolymer materials as solid (or dry or non-aqueous) electrolytes in lithium batteries. Many of these materials are nanostructured and have a first block that provides mechanical strength and a second block that provides ionic conductivity. Such materials self-assemble to create domain nanostructures, often lamellar domain structures, that have structural domains made up of first, mechanically strong blocks and ionically-conductive domains made up of the second, ionically-conductive blocks. These are usually used with electrolyte salts, such as lithium salts. More details about block copolymer electrolyte materials are given below.

Nanostructured Block Copolymer Electrolytes

In one embodiment of the invention, the solid polymer electrolyte, when combined with an appropriate salt, is chemically and thermally stable and has an ionic conductivity of at least $10^{-5}$ Scm$^{-1}$ at battery cell operating temperature. In one arrangement, the polymer electrolyte has an ionic conductivity of at least $10^{-3}$ Scm$^{-1}$ at battery cell operating temperature. Examples of useful battery cell operating temperatures include room temperature (25° C.), 40° C., and 80° C. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, LiB(CN)$_4$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiDFOB, LiTCB, and mixtures thereof. In other embodiments of the invention, for other electrochemistries, electrolytes are made by combining the polymers with various kinds of salts. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$. As described in detail above, a block copolymer electrolyte can be used in the embodiments of the invention.

Figure 1A:
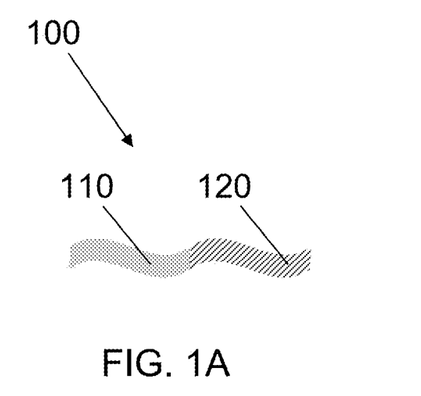
FIG. 1A is a simplified illustration of an exemplary diblock copolymer molecule.

FIG. 1A is a simplified illustration of an exemplary diblock polymer molecule 100 that has a first polymer block 110 and a second polymer block 120 covalently bonded together. In one arrangement both the first polymer block 110 and the second polymer block 120 are linear polymer blocks. In another arrangement, either one or both polymer blocks 110, 120 has a comb (or branched) structure. In one arrangement, neither polymer block is cross-linked. In another arrangement, one polymer block is cross-linked. In yet another arrangement, both polymer blocks are cross-linked.

Figure 1B:
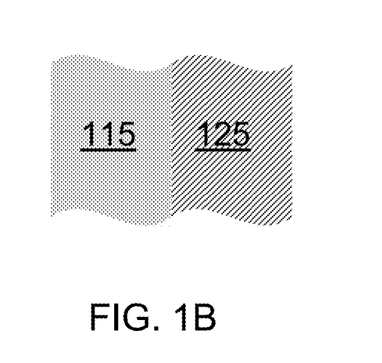
FIG. 1B is a simplified illustration of multiple diblock copolymer molecules as shown in FIG. 1A arranged to form a domain structure.
Figure 1C:
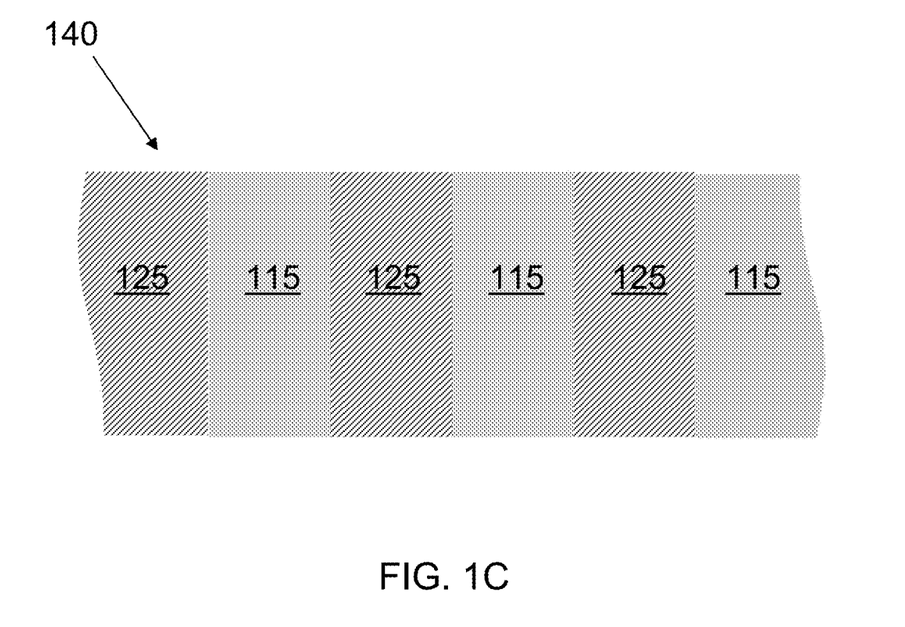
FIG. 1C is a simplified illustration of multiple domain structures as shown in FIG. 1B arranged to form multiple repeat domains, thereby forming a continuous nanostructured block copolymer material.

Multiple diblock polymer molecules 100 can arrange themselves to form a first domain 115 of a first phase made of the first polymer blocks 110 and a second domain 125 of a second phase made of the second polymer blocks 120, as shown in FIG. 1B. Diblock polymer molecules 100 can arrange themselves to form multiple repeat domains, thereby forming a continuous nanostructured block copolymer material 140, as shown in FIG. 1C. The sizes or widths of the domains can be adjusted by adjusting the molecular weights of each of the polymer blocks. In various embodiments, the domains can be lamellar, cylindrical, spherical, or gyroidal depending on the nature of the two polymer blocks and their ratios in the block copolymer.

In one arrangement the first polymer domain 115 is ionically-conductive, and the second polymer domain 125 provides mechanical strength to the nanostructured block copolymer.

Figure 2A:
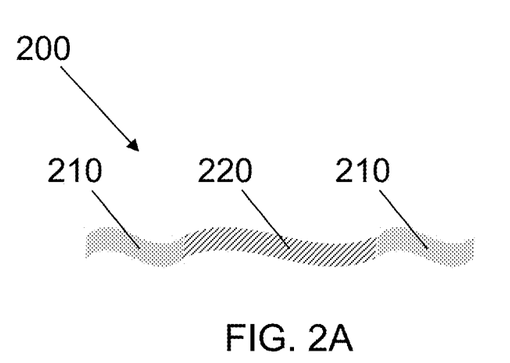
FIG. 2A is a simplified illustration of an exemplary triblock copolymer molecule, wherein two blocks are the same.

FIG. 2A is a simplified illustration of an exemplary triblock polymer molecule 200 that has a first polymer block 210, a second polymer block 220, and a third polymer block 210 that is the same as the first polymer block 210, all covalently bonded together. In one arrangement the first polymer block 210, the second polymer block 220, and the third copolymer block 210 are linear polymer blocks. In another arrangement, either some or all polymer blocks 210, 220, 210 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 2B:
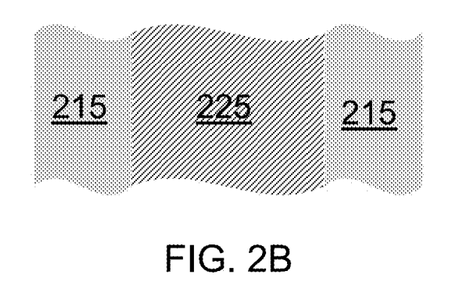
FIG. 2B is a simplified illustration of multiple triblock copolymer molecules as shown in FIG. 2A arranged to form a domain structure
Figure 2C:
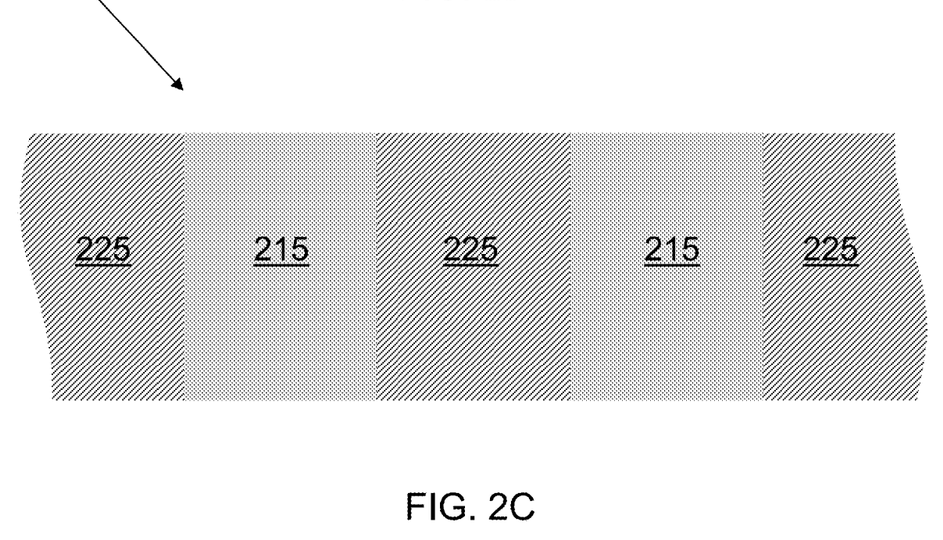
FIG. 2C is a simplified illustration of multiple domain structures as shown in FIG. 2B arranged to form multiple repeat domains, thereby forming a continuous nanostructured block copolymer material.

Multiple triblock polymer molecules 200 can arrange themselves to form a first domain 215 of a first phase made of the first polymer blocks 210, a second domain 225 of a second phase made of the second polymer blocks 220, and a third domain 215 of a first phase made of the third polymer blocks 210 as shown in FIG. 2B. Triblock polymer molecules 200 can arrange themselves to form multiple repeat domains 225, 215, thereby forming a continuous nanostructured block copolymer material 240, as shown in FIG. 2C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first and third polymer domains 215 are ionically-conductive, and the second polymer domain 225 provides mechanical strength to the nanostructured block copolymer. In another arrangement, the second polymer domain 225 is ionically-conductive, and the first and third polymer domains 215 provide a structural framework.

Figure 3A:
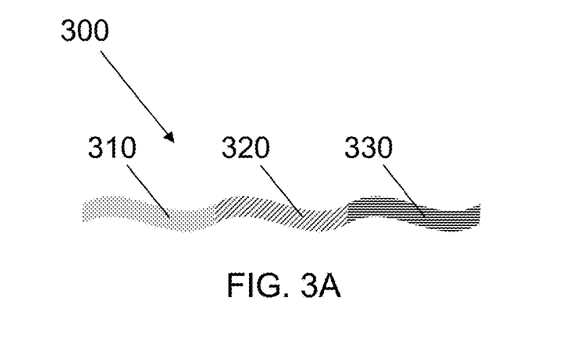
FIG. 3A is a simplified illustration of an exemplary triblock copolymer molecule, wherein no two blocks are the same.

FIG. 3A is a simplified illustration of another exemplary triblock polymer molecule 300 that has a first polymer block 310, a second polymer block 320, and a third polymer block 330, different from either of the other two polymer blocks, all covalently bonded together. In one arrangement the first polymer block 310, the second polymer block 320, and the third copolymer block 330 are linear polymer blocks. In another arrangement, either some or all polymer blocks 310, 320, 330 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 3B:
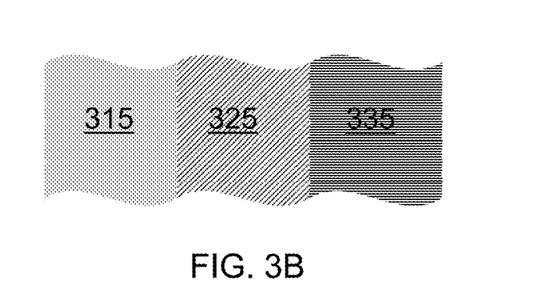
FIG. 3B is a simplified illustration of multiple triblock copolymer molecules as shown in FIG. 3A arranged to form a domain structure
Figure 3C:
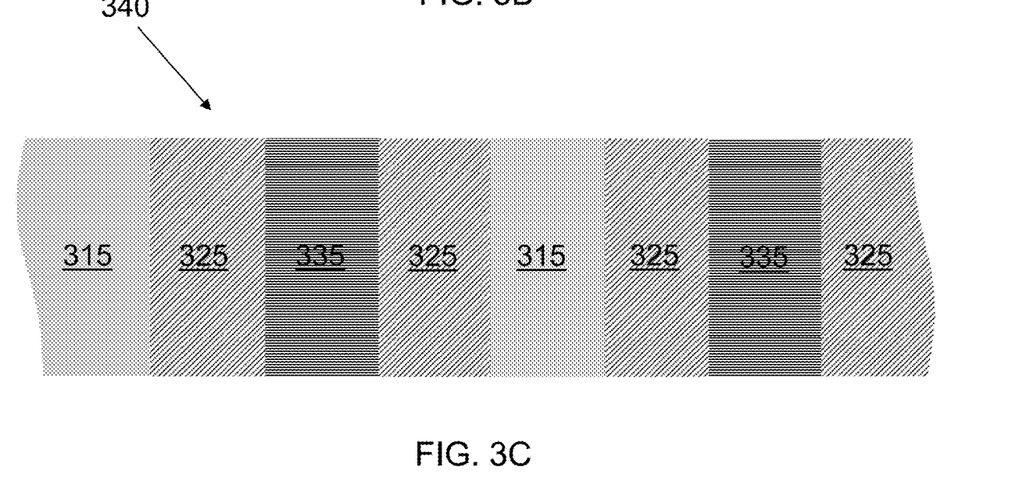
FIG. 3C is a simplified illustration of multiple domain structures as shown in FIG. 3B arranged to form multiple repeat domains, thereby forming a continuous nanostructured block copolymer material.

Multiple triblock polymer molecules 300 can arrange themselves to form a first domain 315 of a first phase made of the first polymer blocks 310, a second domain 325 of a second phase made of the second polymer blocks 320, and a third domain 335 of a third phase made of the third polymer blocks 330 as shown in FIG. 3B. Triblock polymer molecules 300 can arrange themselves to form multiple repeat domains, thereby forming a continuous nanostructured block copolymer material 340, as shown in FIG. 3C. The sizes of the domains can be adjusted by adjusting the molecular weights of each of the polymer blocks. In various arrangements, the domains can be lamellar, cylindrical, spherical, gyroidal, or any of the other well-documented triblock copolymer morphologies depending on the nature of the polymer blocks and their ratios in the block copolymer.

In one arrangement the first polymer domains 315 are ionically-conductive, and the second polymer domains 325 provide mechanical strength to the nanostructured block copolymer. The third polymer domains 335 provides an additional functionality that may improve mechanical strength, ionic conductivity, electrical conductivity, chemical or electrochemical stability, may make the material easier to process, or may provide some other desirable property to the block copolymer. In other arrangements, the individual domains can exchange roles.

In one embodiment of the invention, the ionically-conductive linear block polymer has a molecular weight greater than 50,000 Daltons. In another embodiment of the invention, the ionically-conductive linear block polymer has a molecular weight greater than 100,000 Daltons. In one embodiment of the invention, the structural block polymer has a molecular weight greater than 50,000 Daltons. In another embodiment of the invention, the structural block polymer has a molecular weight greater than 100,000 Daltons. In one embodiment of the invention, the linear diblock copolymer that makes up the domains of the electrolyte has a molecular weight greater than 150,000 Daltons. In another embodiment of the invention, the linear diblock copolymer that makes up the domains of the electrolyte has a molecular weight greater than 350,000 Daltons. In one embodiment of the invention, the linear triblock copolymer that makes up the domains of the electrolyte has a molecular weight greater than 250,000 Daltons. In another embodiment of the invention, the linear triblock copolymer that makes up the domains of the electrolyte has a molecular weight greater than 400,000 Daltons. The molecular weights given herein are weight-averaged molecular weights.

Choosing appropriate polymers for the block copolymers described above is important in order to achieve desired electrolyte properties. In one embodiment, the ionically-conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment the ionically-conductive polymer exhibits ionic conductivity of at least $10^{-3}$ Scm$^{-1}$ at electrochemical cell operating temperatures, such as at 25° C. or at 80° C. when combined with an appropriate salt(s). In one embodiment, the structural material has a modulus in excess of $1 \times 10^5$ Pa at electrochemical cell operating temperatures. In one embodiment, the structural material has a modulus in excess of $1 \times 10^7$ Pa at electrochemical cell operating temperatures. In one embodiment, the structural material has a modulus in excess of $1 \times 10^9$ Pa at electrochemical cell operating temperatures. In one embodiment, the third polymer (1) is rubbery; and (2) has a glass transition temperature lower than operating and processing temperatures. It is useful if all materials are mutually immiscible. In one embodiment the block copolymer exhibits ionic conductivity of at least $10^{-4}$ Scm$^{-1}$ and has a modulus in excess of $1 \times 10^7$ Pa or $1 \times 10^8$ Pa at electrochemical cell operating temperatures. Examples of cell operating temperatures are 25° C. and 80° C.

In one embodiment of the invention, the ionically-conductive phase can be made of a linear polymer. Ionically-conductive linear or branched polymers that can be used in the ionically-conductive phase include, but are not limited to, polyethers, polyamines, polyimides, polyamides, poly alkyl carbonates, polynitriles, and combinations thereof. The ionically-conductive linear or branched polymers can also be used in combination with polysiloxanes, polyphosphazines, polyolefins, and/or polydienes to form the ionically-conductive phase.

In another exemplary embodiment, the ionically-conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, single ion conducting groups, and combinations thereof.

Further details about polymers that can be used in the ionically-conductive phase can be found in International Patent Publication Number WO2009146340 (Dec. 3, 2009), U.S. Pat. No. 8,691,928, (Apr. 8, 2014), International Patent Publication Number WO2010083325 (Jul. 22, 2010), International Patent Publication Number WO2010083330 (Jul. 22, 2010), U.S. Pat. No. 9,048,507, (Jun. 2, 2015), and U.S. Pat. No. 8,598,273 (Dec. 3, 2013), all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Examples of appropriate salts for any electrolyte disclosed herein include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Alkali metal salts such as lithium salts, sodium salts, potassium salts, and cesium salts can be used. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiB(CN)$_4$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiOTf, LiC(Tf)$_3$, LiBOB, LiDFOB, LiBETI, LiTCB and mixtures thereof. Non-lithium salts such as salts of aluminum, sodium, and magnesium are examples of other salts that can be used with their corresponding metals. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$. Concentration of metal salts in the electrolytes disclosed herein range from 5 to 50 wt %, 5 to 30 wt %, 10 to 20 wt %, or any range subsumed therein.

In one embodiment of the invention, single ion conductors can be used with electrolyte salts or instead of electrolyte salts. Examples of lithium single ion conductors include, but are not limited to bound anions based on sulfonamide salts, boron based salts, and sulfate salts.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly (cyclohexyl methacrylate), poly(cyclohexyl vinyl ether), poly(t-butyl vinyl ether), polyethylene, poly(phenylene oxide), poly(phenylene sulfide sulfone), poly(phenylene sulfide ketone), poly(phenylene sulfide amide), polysulfone, polyfluorocarbons such as polyvinylidene fluoride, or copolymers that contain styrene, methacrylates, and/or vinylpyridine. It is especially useful if the structural phase is rigid and is in a glassy or crystalline state.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically-conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the ionically-conductive phase. The additives that enhance ionic conductivity can be broadly classified in the following categories: low molecular weight ionically-conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Further details about block copolymer electrolytes are described in U.S. Pat. No. 8,563,168, issued Oct. 22, 2013, U.S. Pat. No. 8,268,197, issued Sep. 18, 2012, and U.S. Pat. No. 8,889,301, issued Nov. 18, 2014, all of which are included by reference herein.

Interpenetrating Crosslinked Polymer Networks

In general, when ionically-conductive polymers are crosslinked, their moduli are increased and their conductivities are decreased. The decrease in ionic-conductivity may be due to restricted polymer chain mobility in crosslinked polymers.

Surprisingly, it has been found that when crosslinked polymer networks are introduced into non-crosslinked, ionically-conductive domains of a block copolymer electrolyte, the modulus of the electrolyte is increased, that is, the mechanical strength is increased, with no loss of ionic conductivity. Additionally, other aspects of mechanical properties are improved such as yield strength, toughness, and resistance to creep.

In one embodiment of the invention, crosslinked polymer networks are interpenetrated into the ionically-conductive domains of a block copolymer electrolyte. The crosslinked interpenetrating polymer network (IPN) is miscible with but does not bond to the ionically-conductive polymer of the ionically-conductive domain.

Figure 4:
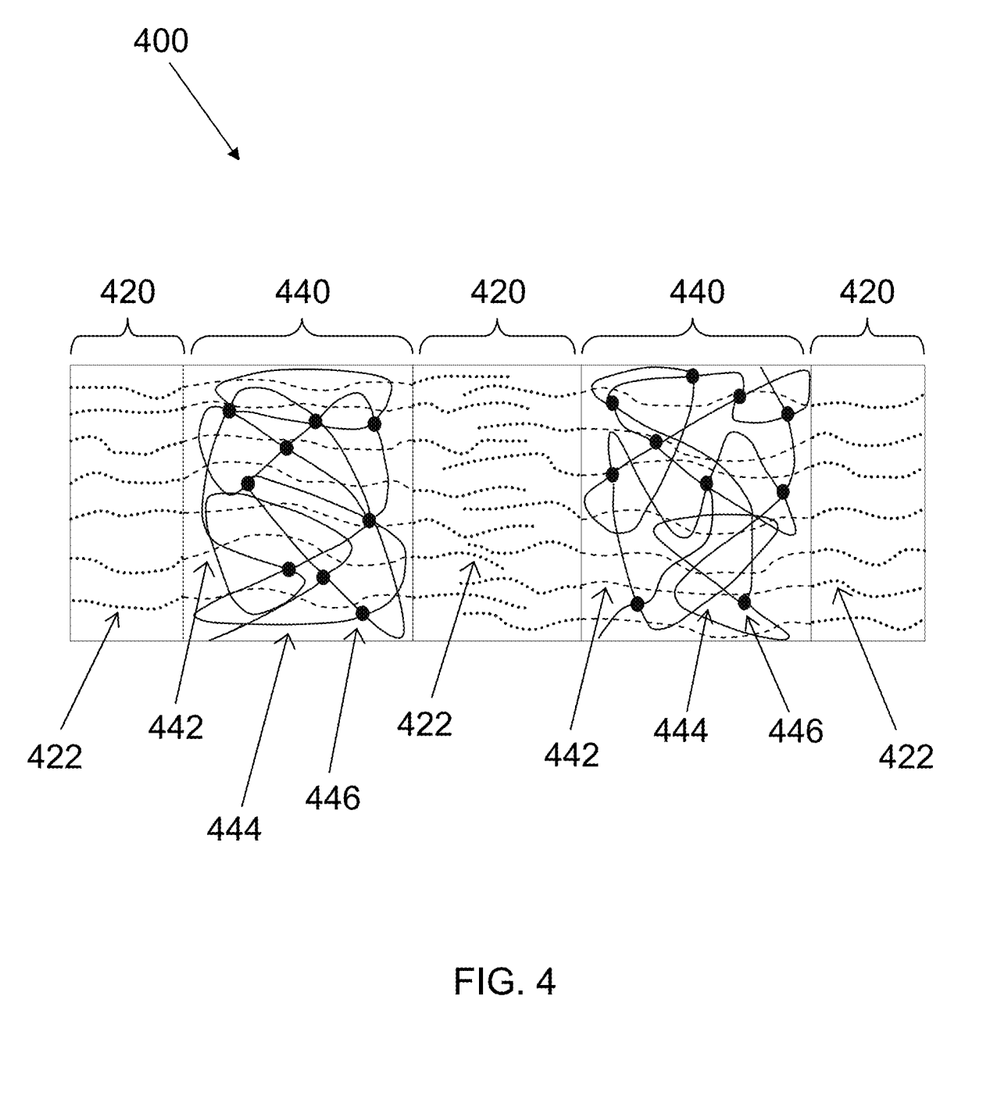
FIG. 4 is a schematic illustration of a block copolymer that has a crosslinked interpenetrating polymer network in some domains, according to an embodiment of the invention.

FIG. 4 is a schematic illustration that shows a portion of a block copolymer electrolyte 400 that has structural domains 420 and ionically-conductive domains 440, according to an embodiment of the invention. As described in detail above, the structural domains 420 contain many individual structural polymer molecules 422, and the ionically-conductive domains 440 contain many individual ionically-conductive molecules 442. Crosslinked IPN polymer chains 444 are distributed throughout the ionically-conductive domains 440 to form interpenetrating polymer networks. Some of the crosslinking sites among the IPN polymer chains 444 are shown as 446. There is no crosslinking among the ionically-conductive polymers 442 or between the ionically-conductive polymers 442 and the IPN polymer chains 444.

In one embodiment of the invention, crosslinked poly (ethylene oxide-co-allyl glycidyl ether) makes an interpenetrating polymer network within the ionically-conductive polyethylene oxide (PEO) phase of a block copolymer electrolyte. There are no covalent links between the poly (ethylene oxide-co-allyl glycidyl ether) and the PEO, thus allowing normal mobility of the ionically-conductive PEO chains in the block copolymer, while increasing the overall modulus and mechanical properties of the electrolyte material.

Layers of block copolymer electrolyte that are used as separators in batteries are usually thin films on the order of 10 to 30 µm thick. Such thin films are often formed by coating or extrusion. In order to facilitate thin film formation, it is most useful if the IPN is crosslinked after the thin film is formed. In one embodiment of the invention, the IPN precursor polymer is mixed into the block copolymer electrolyte in an uncrosslinked, latent form, compatible with the conditions of thin film formation. Subsequent to formation of the thin film from the block copolymer that contains the IPN precursor polymer that will form the IPN, the film is exposed to a treatment that induces crosslinking in the IPN precursor polymer, thereby forming the IPN. Typical treatments include thermal treatments, light treatments, and a combination of the two. Typical reactions that are stimulated by such treatments include base-catalyzed (anionic) reactions, acid-catalyzed (cationic) reactions, radical reactions, and pericyclic reactions. Latent groups susceptible to base-catalyzed reactions include glycidyl (epoxy). Latent groups susceptible to acid-catalyzed reactions include oxetanyl. Latent groups susceptible to radical reactions include alkenes, (meth)acrylates, styrenics, thiol-ene, and thiol-yne. Latent groups susceptible to pericyclic reactions include alkenes, protected furans, and maleimides.

In one embodiment of the invention, IPN is crosslinked through either thermal initiation or photoinitiation. Thermal initiators may be mixed into the IPN. Exposure to temperatures between 60° C. and 120° C. can effect crosslinking. It may be useful to perform thermal initiation in an oxygen-free environment. Photoinitiators may be mixed into the IPN. Exposure to UV (ultraviolet radiation) can effect crosslinking. The appropriate wavelength for photoinitiation is specific to the photoiniator used, as would be know to a person with ordinary skill in the art. The appropriate time period for photoiniation depends on both the photoiniator used and on the configuration of the IPN-containing film. Examples of thermal initiators and photoinitiators that can be used in the embodiments of the invention are shown below in Table 1 and Table 2, respectively.

TABLE 1

Exemplary Thermal Initiators

| | |
|---|---|
| tert-Amyl peroxybenzoate | tert-Butyl peracetate |
| 4,4-Azobis(4-cyanovaleric acid) | tert-Butyl peroxide |
| 1,1'-Azobis(cyclohexanecarbonitrile) | tert-Butyl peroxybenzoate |
| 2,2'-Azobisisobutyronitrile (AIBN) | tert-Butylperoxy isopropyl carbonate |
| Benzoyl peroxide | Cumene hydroperoxide |
| 2,2-Bis(tert-butylperoxy)butane | Cyclohexanone peroxide |
| 1,1-Bis(tert-butylperoxy)cyclohexane | Dicumyl peroxide |
| 2,5-Bis(tert-butylperoxy)-2,5-dimethylhexane | Lauroyl peroxide |
| 2,5-Bis(tert-Butylperoxy)-2,5-dimethyl-3-hexyne | 2,4-Pentanedione peroxide |
| Bis(1-(tert-butylperoxy)-1-methylethyl)benzene | Peracetic acid |
| 1,1-Bis(tert-butylperoxy)-3,3,5-trimethylcyclohexane | Potassium persulfate |
| tert-Butyl hydroperoxide | |

TABLE 2

Exemplary Photoinitiators

| | |
|---|---|
| Acetophenone | 4-(Dimethylamino)benzophenone |
| Anisoin | 4,4'-Dimethylbenzil |
| Anthraquinone | 2,5-Dimethylbenzophenone |
| Anthraquinone-2-sulfonic acid, sodium salt monohydrate | 3,4-Dimethylbenzophenone |
| (Benzene) tricarbonylchromium | Diphenyl(2,4,6-trimethylbenzoyl)phosphine oxide |
| Benzil | 4'-Ethoxyacetophenone |
| Benzoin, sublimed | 2-Ethylanthraquinone |
| Benzoin ethyl ether | Ferrocene |
| Benzoin isobutyl ether, tech. | 3'-Hydroxyacetophenone |
| Benzoin methyl ether | 4'-Hydroxyacetophenone |
| Benzophenone | 3-Hydroxybenzophenone |
| 3,3',4,4'-Benzophenonetetracarboxylic dianhydride, sublimed | 4-Hydroxybenzophenone |
| 4-Benzoylbiphenyl | 1-Hydroxycyclohexyl phenyl ketone |
| 2-Benzyl-2-(dimethylamino)-4'-morpholinobutyrophenone | 2-Hydroxy-2-methylpropiophenone |
| 4,4'-Bis(diethylamino)benzophenone | 2-Methylbenzophenone |
| 4,4'-Bis(dimethylamino)benzophenone | 3-Methylbenzophenone |
| Camphorquinone | Methybenzoylformate |
| 2-Chlorothioxanthen-9-one | 2-Methyl-4'-(methylthio)-2-morpholinopropiophenone |
| (Cumene)cyclopentadienyliron(II) hexafluorophosphate | Phenanthrenequinone |
| Dibenzosuberenone | 4'-Phenoxyacetophenone |
| 2,2-Diethoxyacetophenone | Thioxanthen-9-one |
| 4,4'-Dihydroxybenzophenone | Triarylsulfonium hexafluoroantimonate salts |
| 2,2-Dimethoxy-2-phenylacetophenone | Triarylsulfonium hexafluorophosphate salts |

In one arrangement, the IPN precursor polymer is made up of one or more monomers. The crosslinking treatment stimulates reactions that form entirely new polymer chains from the monomers. The same treatment or an additional treatment causes crosslinking of the new polymer chains. An advantage of this approach is that such small monomers may be readily miscible in the block copolymer.

In another arrangement, the IPN precursor polymer is a preformed polymer which carries latent reactive groups that can link together. This is especially advantageous if the block copolymer material is to be coated, extruded, or heated. Polymers are much less volatile than monomers, which tend to be small, volatile molecules that can evaporate away easily. On the other hand, polymers are more likely to be immiscible, so there is risk of the original polymer and the added IPN precursor polymer separating macroscopically into physically distinct domains, which would prevent formation of an IPN.

In one embodiment of the invention, the ionically-conductive polymer of the block copolymer is used as the basis for the IPN precursor polymer. It can be useful if the IPN precursor polymer has substituted some portion of its polymeric makeup with monomer residues that include latent reactive groups. There are tradeoffs in choosing the proportion of monomer residues for the IPN precursor polymer. The mutual miscibility of the ionically-conductive polymer and IPN precursor polymer decreases as the degree of substitution increases. Yet the efficiency of IPN formation increases as the number of reactive groups increases. In various arrangements, between 2 wt % and 40 wt %, between 5 wt % and 30 wt %, between 10 wt % and 20 wt %, or any range subsumed therein of the IPN precursor polymer is substituted with monomer residues that have latent reactive groups.

In another arrangement, the ionically-conductive polymer of the block copolymer is used as the basis for the IPN precursor polymer in a different way. The IPN precursor polymer may include the ionically-conductive polymer (of the block copolymer) as one block in a new block copolymer to be used to make an IPN. For example, PEO, often used as the ionically-conductive polymer of a block copolymer, cannot generally be crosslinked. If it is used with allyl glycidyl ether (AGE) to form a new block copolymer (P(EO-b-AGE)), the new block copolymer can be crosslinked through the allyl glycidyl ether portion and used as to form an IPN in PEO.

There are also tradeoffs in choosing the molecular weight of an IPN precursor polymer. Lower molecular weights favor miscibility, while larger molecular weights (longer molecules) favor network formation. In various arrangements, the molecular weight of the IPN precursor polymer is between 20% and 80%, between 25% and 75%, between 30% and 50%, or any range subsumed therein of the molecular weight of the original polymer.

It should be understood that random pairings of ionically-conductive polymers with polymers that may form interpenetrating polymer networks are not likely to be successful. As discussed above, there are many factors to consider in choosing an appropriate pairing. Some examples of useful pairings between ionically-conductive polymers and polymers that can make up interpenetrating polymer networks (IPN) are shown in Table 3 below.

TABLE 3

Listing of Exemplary IPN Polymers for use with Ionically-Conductive Polymers

| Polymer Class | Ionically-Conductive Polymer | IPN Polymer |
|---|---|---|
| Polyethers | Polyethyleneoxide | Poly(ethylene oxide-co-allyl glycidyl ether), poly(methylmethacrylate-block-allyl glycidyl ether), |
| Polyamines | Poly(allylamine-b-ethyleneoxide) | Poly[allylamine-b-(ethyleneoxide-co-allylglycidylether)] |
| Polyimides | Poly(oxydiphenylene-pyromellitimide-b-ethyleneoxide) | Poly[oxydiphenylene-pyromellitimide-b-(ethyleneoxide-co-allylglycidylether)] |
| Polyamides | Poly(pthalamide-b-ethyleneoxide) | Poly[pthalamide-b-(ethyleneoxide-co-allylglycidylether] |
| Poly alkyl carbonates | Poly(vinylenecarbonate-b-dimethylsiloxane) | Poly(vinylenecarbonate-b-vinylmethylsiloxane), Poly(vinylenecarbonate-b-divinylsiloxane) |
| Polynitriles | Poly(acrylonitrile-b-styrene) | Poly[acrylonitrile-b-(styrene-co-allyloxylstyrene)], Poly(acrylonitrile-b-isoprene) |
| Polysiloxanes | Poly(dimethylsiloxane-b-ethyleneoxide) | Poly(vinylmethylsiloxane-b-ethyleneoxide), Poly[dimethylsiloxane-b-(ethyleneoxide-co-allylglycidylether)] |
| Polyphosphazines | Poly(phosphazines-graft-ethyleneoxide) | Poly[phosphazines-graft-(ethyleneoxide-co-allylglycidylether)], Poly(divinylphosphazine-graft-ethyleneoxide) |
| Polydienes | Poly(isoprene-b-ethyleneoxide) | Poly[isoprene-b-(ethyleneoxide-co-allylglycidylether)] |
| Polyolefins | Poly(ethylene-b-ethyleneoxide) | Poly[ethylene-b-(ethyleneoxide-co-allylglycidylether)] |

The crosslinked interpenetrating polymer network made from a crosslinked polymer in a block copolymer phase has distinct performance and processing advantages over either the block copolymer or the crosslinked polymer as a stand-alone material.

In general, a simple crosslinked polymer resists deformation and does not flow because the crosslinking makes such deformation and flow difficult. But crosslinking is often desirable as it increases the rigidity of a polymer.

The softening temperature (either the glass transition temperature, $T_g$, or the melting temperature, $T_m$) of a block copolymer that is not crosslinked is usually the same as the softening temperature of the block with the highest softening temperature. In cases where one block is crosslinked (such as to increase rigidity), the softening temperature may be the same as that of the non-crosslinked block.

As discussed above, crosslinking reduces the ionic conductivity of ionically-conductive polymers. But by using the IPN structures disclosed herein, the rigidity of an ionically-conductive polymer can be increased with no loss of ionic conductivity.

Similarly, when such an IPN is added to the ionically-conductive domains (to form ionically-conductive IPN domains) in a block copolymer electrolyte, as disclosed herein, the rigidity (and other desirable mechanical properties) of the block copolymer electrolyte increases with no loss of ionic conductivity. This can make it possible to increase the proportion of the ionically-conductive IPN domains in a block copolymer electrolyte without loss of rigidity (and other desirable mechanical properties). In a block copolymer that does not have an IPN in the ionically-conductive domain, increasing the proportion of the ionically-conductive domains results in an overall decrease in desirable mechanical properties.

In one arrangement, the ionically-conductive IPN domains account for at least 50% (by volume) of the block copolymer electrolyte. In another arrangement, the ionically-conductive IPN domains account for at least 60% (by volume) of the block copolymer electrolyte. In another arrangement, the ionically-conductive IPN domains account for at least 75% (by volume) of the block copolymer electrolyte. In another arrangement, the ionically-conductive IPN domains account for at least 90% (by volume) of the block copolymer electrolyte.

While the ionic conductivity of the block copolymer electrolyte may be the same no matter what the proportion of the ionically-conductive IPN domains, there are other enhancements to ionic transport properties that may occur when the volume fraction of the ionically-conductive IPN domains account for more than half the electrolyte. For example, the overall molarity of salt in the electrolyte can be increased without having to raise the local salt concentration in the ionically-conductive IPN phase itself. This method of increasing salt molarity is preferred to simply adding more salt to the ionically-conductive phase because ionic conductivity often has a maximum at intermediate salt concentrations and decreases when yet more salt is added. Additionally, increasing the volume fraction of the ionically-conductive IPN domains to increase salt molarity is preferred to simply increasing the ratio of ionically-conductive domains (with no IPN) to structural domains, which can compromise mechanical properties as discussed above. The increase in salt molarity due to increasing the volume fraction of the ionically-conductive IPN domain in the electrolyte increases ionic transport properties such as the limiting current density of the electrolyte, which can result in improved charge and discharge rates when such electrolytes are used in a battery cell or similar device. Thus, incorporation of an IPN into the ionically-conductive domain in a block copolymer electrolyte can be used to improve both the mechanical and ionic transport properties of the electrolyte.

Furthermore, the addition of the IPN does not adversely affect the deformation or flow properties of the block copolymer; an IPN block copolymer can be deformed and molded at and above the softening temperature of the block copolymer. This may be because the crosslinks are confined to a single phase; the other phase still has mobility and can enable the material to be molded or shaped. For this reason an IPN blockcopolymer electrolyte can form good interfaces with electrode active materials when applied at high temperature or when coated from a plasticizing solvent, something that is not possible with a simple crosslinked system.

Figure 5:
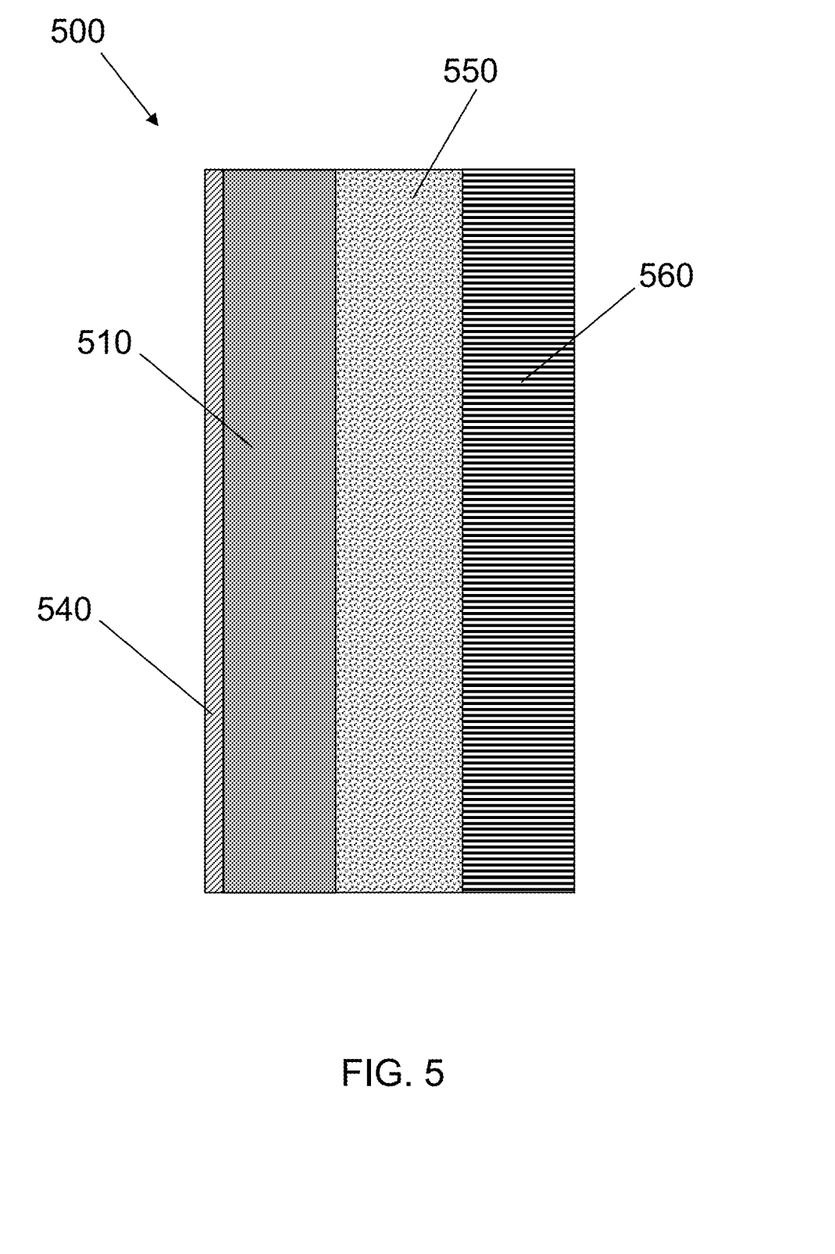
FIG. 5 is a cross-sectional schematic drawing of an electrochemical cell, according to an embodiment of the invention.

In one embodiment of the invention, block copolymer electrolytes described herein are used as separators in electrochemical cells, such as lithium battery cells. FIG. 5 is a cross-sectional schematic drawing of an electrochemical cell 500 with a positive electrode 510, a negative electrode 560, and a separator electrolyte 550. There is a current collector 540 adjacent to and in electronic communication with the positive electrode 510. The negative electrode 560 can be a metal, such as lithium, or some other material that can absorb and release Li ions, such as graphite, silicon or tin. There may also be a negative electrode current collector (not shown) adjacent to and in electronic communication with the negative electrode 560. The separator electrolyte 550 is between the positive electrode 510 and the negative electrode 560. There is also a cathode electrolyte (not shown) within the positive electrode 510.

The separator electrolyte 550 may be any of the block copolymer electrolytes with interpenetrating polymer networks in the ionically-conductive domains as disclosed here. In some arrangements, the same electrolytes can also be used as the cathode electrolyte (not shown).

EXAMPLES

The following examples provide details relating to composition, fabrication and performance characteristics of block copolymer electrolytes that have interpenetrating polymer networks in their ionically-conductive domains, in accordance with the present invention. It should be understood the following is representative only, and that the invention is not limited by the detail set forth in these examples.

A block copolymer film that has an IPN in its ionically-conductive domain was prepared as follows. Poly(styrene-b-ethylene oxide) (PS-PEO) blockcopolymer (50% PS/50% PEO) (4.66 g) and CsTFSI (cesium bis(trifluoromethanesulfonyl)imide) salt (1.33 g), were dissolved in 50 g of cyclohexanone at 60° C. and then allowed to cool to 25° C. A solution of 0.006 wt. % AIBN in cyclohexanone (0.66 g) was added to the dissolved block copolymer mixture to form a first solution. Separately, 2 g of poly(ethylene oxide-co-allyl glycidyl ether) copolymer (90% PEO/10% PAGE) and 0.25 g pentaerythritol tetrakis(3-mercaptopropionate) were dissolved in 10 g cyclohexanone at 25° C. to form a second solution. The first solution and the second solution were combined at a ratio of 1:1 by weight. This final mixture was coated onto a Teflon® substrate to form a film that was then was heated in the absence of oxygen for 12 hours at 70° C. to facilitate crosslinking of the poly(ethylene oxide-co-allyl glycidyl ether) copolymer to form the interpenetrating polymer network. The film was later removed from the substrate.

A block copolymer film that has an IPN in its ionically-conductive domain was prepared as follows. Poly(styrene-b-ethylene oxide) (PS-PEO) blockcopolymer (60% PS/40% PEO) (5 g), 2 g of poly(ethylene.oxide-co-allyl glycidyl ether) copolymer (90% PEO/10% PAGE) (1.3 g) and LiTFSI (Lithium bis(trifluoromethanesulfonyl)imide) salt (1.656 g), were dissolved in 45 g of cyclohexanone at 60° C. and then allowed to cool to 25° C. A solution of 1 gram of Phenylbis(2,4,6-trimethylbenzoyl)phosphine oxide (photoinitiator) (0.50 g) in cyclohexanone (9.5 g) was added to the dissolved blockcopolymer mixture to form the final solution. The mixture was coated onto a Teflon® substrate to form a film that was then heated under vacuum for 12 hours at 70° C. to completely remove residual solvent. Crosslinking was then initiated by exposing the film to a 365 nm UV light source for 10 mins. The film was later removed from the substrate.

A PS-PEO film with CsTFSI salt without the IPN was also prepared, and both films were measured for mechanical strength at 80° C. using a dynamic mechanical analyzer. The PS-PEO film that did not have the IPN had a Young's modulus of 76 MPa. The PS-PEO film with the IPN had a Young's modulus of 154 MPa.

Similarly, a PS-PEO film without the IPN and a PS-PEO film with the IPN were prepared using LiTFSI instead of CsTFSI and their ionic conductivities were measured at 80° C. The PS-PEO film that did not have the IPN and the PS-PEO film that did have the IPN both had ionic conductivities of 0.3 mS/cm.

As shown in this example, an interpenetrating crosslinked polymer network mixed into the ionically-conductive domain of a block copolymer electrolyte improves the mechanical properties of the electrolyte without limiting the mobility of ionically-conductive polymer chains.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrolyte material comprising:
a first domain having a modulus greater than $1\times10^7$ Pa at 25° C., the first domain comprising a plurality of first polymer blocks; and
a second domain forming an ionically-conductive portion of the electrolyte material, the second domain adjacent to the first domain, the second domain comprising:
a plurality of second polymer blocks and a salt; and
a crosslinked, interpenetrating network of third polymers mixed into the plurality of second polymer blocks and not bonded to the plurality of second polymer blocks;
wherein the electrolyte material comprises a diblock copolymer, and
wherein the crosslinked, interpenetrating network of third polymers are selected from the group consisting of poly(methylmethacrylate-block-allyl glycidyl ether), poly[allylamine-b-(ethyleneoxide-co-allylglycidylether)], poly[oxydiphenylene-pyromellitimide-b-(ethyleneoxide-co-allylglycidylether)], poly[pthalamide-b-(ethyleneoxide-co-allylglycidylether)], poly(vinylenecarbonate-b-vinylmethylsiloxane), poly(vinylenecarbonate-b-divinylsiloxane), poly[acrylonitrile-b-(styrene-co-allyloxyl styrene)], poly(acrylonitrile-b-isoprene), poly(vinylmethylsiloxane-b-ethyleneoxide), poly[dimethylsiloxane-b-(ethyleneoxide-co-allylglycidylether)], poly[phosphazines-graft-(ethyleneoxide-co-allylglycidylether)], poly(divinylphosphazine-graft-ethyleneoxide), poly[isoprene-b-(ethyleneoxide-co-allylglycidylether)], and poly[ethylene-b-(ethyleneoxide-co-allylglycidylether)].

2. The electrolyte material of claim 1 wherein the first domain and the second domain are lamellar domains.

3. The electrolyte material of claim 1 wherein the electrolyte material has an ionic conductivity of at least $1 \times 10^{-5}$ Scm$^{-1}$ at 90° C.

4. The electrolyte material of claim 1 wherein the second domain comprises at least 50% or 75% by volume of the electrolyte material.

5. The electrolyte material of claim 1 wherein the plurality of first polymer blocks are one or more selected from the group consisting of polystyrene, hydrogenated polystyrene, polymethacrylate, poly(methyl methacrylate), polyvinylpyridine, polyvinylcyclohexane, polyimide, polyamide, polypropylene, poly (2,6-dimethyl-1,4-phenylene oxide) (PXE), polyolefins, poly(t-butyl vinyl ether), poly(cyclohexyl methacrylate), poly(cyclohexyl vinyl ether), polyethylene, poly(phenylene oxide), poly(phenylene sulfide sulfone), poly(phenylene sulfide ketone), poly(phenylene sulfide amide), polysulfone, polyfluorocarbons, and copolymers that contain styrene, methacrylates, and/or vinylpyridine.

6. The electrolyte material of claim 1 wherein the plurality of second polymer blocks are one or more selected from the group consisting of polyethers, polyamines, polyimides, polyamides, alkyl carbonates, polynitriles, polysiloxanes, polyphosphazines, polyolefins, polydienes, and combinations thereof.

7. The electrolyte material of claim 1 wherein the plurality of second polymer blocks comprise an ionically-conductive comb polymer having a backbone and pendant groups.

8. The electrolyte material of claim 7 wherein the backbone comprises one or more selected from the group consisting of polysiloxanes, polyphosphazines, polyethers, polydienes, polyolefins, polyacrylates, polymethacrylates, and combinations thereof.

9. The electrolyte material of claim 7 wherein the pendant groups comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

10. The electrolyte material of claim 1, wherein the plurality of second polymer blocks do not form crosslinks with each other.

11. The electrolyte material of claim 1 wherein the plurality of first polymer blocks are one or more selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), polyethylene, polyfluorocarbons, and copolymers that contain styrene, methacrylates, and/or vinylpyridine.

12. The electrolyte material of claim 1, wherein the plurality of second polymer blocks includes polyamines and the crosslinked, interpenetrating network of third polymers includes poly[allylamine-b-(ethyleneoxide-co-allylglycidylether)].

13. The electrolyte material of claim 1, wherein the plurality of second polymer blocks includes polyimides and the crosslinked, interpenetrating network of third polymers includes poly[oxydiphenylene-pyromellitimide-b-(ethyleneoxide-co-allylglycidylether)].

14. The electrolyte material of claim 1, wherein the plurality of second polymer blocks includes polyamides and the crosslinked, interpenetrating network of third polymers includes poly[pthalamide-b-(ethyleneoxide-co-allylglycidylether)].

15. The electrolyte material of claim 1, wherein the plurality of second polymer blocks includes alkyl carbonates and the crosslinked, interpenetrating network of third polymers includes poly(vinylenecarbonate-b-vinylmethylsiloxane) or poly(vinylenecarbonate-b-divinylsiloxane).

16. The electrolyte material of claim 1, wherein the plurality of second polymer blocks includes polynitriles and the crosslinked, interpenetrating network of third polymers includes poly[acrylonitrile-b-(styrene-co-allyloxylstyrene)] or poly(acrylonitrile-b-isoprene).

17. The electrolyte material of claim 1, wherein the plurality of second polymer blocks includes polysiloxanes and the crosslinked, interpenetrating network of third polymers includes poly(vinylmethylsiloxane-b-ethyleneoxide) or poly[dimethylsiloxane-b-(ethyleneoxide-co-allylglycidylether)].

18. A battery cell, comprising:
 a positive electrode comprising a first electrolyte and positive electrode material;
 a negative electrode comprising lithium metal or lithium alloy; and
 a second electrolyte between the positive electrode and the negative electrode, the second electrolyte providing ionic communication and separation between the positive electrode and the negative electrode, the second electrolyte comprising the electrolyte material of claim 1.

19. An electrolyte material comprising:
 a first domain having a modulus greater than $1 \times 10^7$ Pa at 25° C., the first domain comprising a plurality of first polymer blocks; and
 a second domain forming an ionically-conductive portion of the electrolyte material, the second domain adjacent to the first domain, the second domain comprising:
 a plurality of polyethylene oxide polymer blocks and a salt; and
 a crosslinked, interpenetrating network of poly(methylmethacrylate-block-allyl glycidyl ether) mixed into the plurality of polyethylene oxide polymer blocks and not bonded to the plurality of polyethylene oxide polymer blocks;
 wherein the electrolyte material comprises a diblock copolymer.

20. The electrolyte material of claim 19, wherein the plurality of polyethylene oxide polymer blocks do not form crosslinks with each other.

* * * * *

UNITED STATES PATENT AND TRADEMARK OFFICE
CERTIFICATE OF CORRECTION

Page 1 of 1

PATENT NO.       : 10,879,563 B2
APPLICATION NO.  : 15/449872
DATED            : December 29, 2020
INVENTOR(S)      : Hany Basam Eitouni It is certified that error appears in the above-identified patent and that said Letters Patent is hereby corrected as shown below:

In the Claims

Column 16, Line 61-62, Claim 1:
After "consisting of poly(methylmethacrylate-block-allyl glycidyl ether),"
Delete "poly[allylamine-b-(ethyleneoxide-co-allylglycidylet her)]" and
Insert --poly[allylamine-b-(ethyleneoxide-co-allylglycidylether)]--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*